US005206072A

United States Patent [19]
Haga

[11] Patent Number: 5,206,072
[45] Date of Patent: Apr. 27, 1993

[54] ELECTROSTATIC RECORDING FILM

[75] Inventor: Katsuhiko Haga, Shizuoka, Japan

[73] Assignee: Fuji Photo Film Co., Ltd., Kanagawa, Japan

[21] Appl. No.: 796,556

[22] Filed: Nov. 22, 1991

[30] Foreign Application Priority Data

Nov. 22, 1990 [JP] Japan .................................. 2-319749

[51] Int. Cl.$^{5}$ .................................................. B32B 9/00
[52] U.S. Cl. .................................... 428/195; 428/323; 428/327; 428/328; 428/331; 428/403; 428/913; 428/402; 428/220; 428/211
[58] Field of Search ............... 428/195, 323, 327, 328, 428/331, 403, 913, 402

[56] References Cited

U.S. PATENT DOCUMENTS 5,116,666 5/1992 Konno ................................ 428/220

OTHER PUBLICATIONS

Japanese abstract J02083547 dated Mar. 23, 1990 Fuji Photo.

*Primary Examiner*—Patrick J. Ryan
*Assistant Examiner*—Abraham Bahta
*Attorney, Agent, or Firm*—Sughrue, Mion, Zinn, Macpeak & Seas

[57] ABSTRACT

There is disclosed an electrostatic recording film comprising an insulating film having provided thereon an electrocondcutive layer and an insulating layer in this sequence, wherein the insulating layer comprises at least a high polymeric binder, insulating spacer grains and electroconductive grains prepared by coating an electrocondcutive material on the surface of organic polymer grains. In the present invention, it is possible to coat a coating solution comprising the above components at a high speed and the film thus prepared can always provide stably a sharp image having little fog, pepper speck and scratchwise image dropout.

12 Claims, No Drawings

ELECTROSTATIC RECORDING FILM

FIELD OF THE INVENTION

The present invention relates to an electrostatic recording film and, particularly to an electrostatic recording film which is used in an electrostatic printer to output the drawings in CAD (Computer Aided Design).

BACKGROUND OF THE INVENTION

An electrostatic recording film in which an electroconductive layer and an insulating layer are provided on an insulating film in this sequence is known.

In general, electrostatic recording is done in such a manner that a recording voltage is applied to a multi-pin electrode head (hereinafter, referred to as the pin electrode) to cause an aerial discharge in a narrow space (hereinafter, referred to as the gap) between the pin electrode and the insulating layer of the electrostatic recording film, whereby an electrostatic latent image is formed on the surface of the insulating layer, followed by developing the electrostatic latent image with a toner to thereby form a visible image.

In order to obtain a sharp image in the electrostatic recording system, it is necessary to control the gap in a predetermined range deviating from the Paschen's curve. For this purpose, such a system is generally employed that insulating spacer grains are added to give a suitable roughness to the insulating layer, and the pin electrode is contacted to the insulating layer to thereby control the gap in a prescribed range. It is known that in the above electrostatic recording film, a sharp image cannot be obtained without adding the insulating spacer grains, while it is known that imperfect grounding (earthing) of the electroconductive layer causes fogging.

In the electrostatic recording film using an insulating film, it is impossible to ground the film side of the insulating film, whereas in a conventional electrostatic recording paper, it is possible to ground the paper side of the electroconductive paper. In order to solve this problem in the electrostatic recording film, a portion of the electroconductive layer (usually, the end portion thereof) is exposed, or the exposed portion is coated with an electro-conductive paint such as a carbon paint to provide a grounding electrode. However, this results in decrease in manufacturing efficiency due to more time necessary to provide an exposed portion on the electroconductive layer according to the widths of various products, and an increased production step for coating an electroconductive paint. To cope with this problem, it is proposed in JP-A-61-213851 (the term "JP-A" as used herein refers to a published unexamined Japanese patent application) that electroconductive powders including metals such as Fe, Cu, Ni and Ag, alloys such as stainless steel and Ni-Cr alloy, metal oxides such as tin oxide, and metal compounds such as copper iodide, are introduced into the insulating layer, wherein the weight ratio of high polymeric binders to the electroconductive powders ranges from 100/0.1 to 100/10. In such an electrostatic recording film, however, while fog decreases, partial broadening of lines (hereinafter, referred to as pepper speck) and scratchwise dropout of images in the direction parallel to a recording electrode rather increase and make it impossible to use the film for drawings in CAD where precise drawing is required.

Further, there is the problem that the electro-conductive powders are liable to damage the recording electrode. To solve this problem, it is proposed in JP-A-2-83547 that carbon black, metals such as Fe and electroconductive grains such as tin oxide are introduced into an insulating layer, wherein the weight ratio of the high polymeric binders to the electroconductive grains is 100/0.0001 to 100/0.01 and that of the insulating spacer grains to the electroconductive grains is not more than 1000/5. In such an electrostatic recording film, while fog, pepper speck and scratchwise image dropout decrease without fail, they have not yet perfectly been prevented from causing and therefore, the improvement in this matter is strongly demanded.

In addition, a larger specific gravity causes the electroconductive powders to settle down in a coating solution. Prevention of settling necessitates a larger specific gravity and viscosity of the coating solution, which cause another problem that the larger specific gravity and viscosity deteriorates high speed coating.

SUMMARY OF THE INVENTION

The object of the present invention is to provide an electrostatic recording film in which the above problems are solved and a sharp image can be obtained with causing little pepper speck and scratchwise image dropout.

The above object of the invention can be achieved by an electrostatic recording film comprising an insulating film having provided thereon an electroconductive layer and an insulating layer in this sequence, wherein the insulating layer comprises at least a high polymeric binder, insulating spacer grains and electroconductive grains; and the electroconductive grains are prepared by coating an electroconductive material on the surface of organic polymer grains.

DETAILED DESCRIPTION OF THE INVENTION

The insulating film used in the invention may be a conventional one as far as it has good transparency and excellent mechanical strength. An opaque film can be used by application (e.g., mat-type electrostatic recording film). The preferable examples of the resins used for this film are polyester, polyolefin, polyamide, polyesteramide, polyether, polyimide, polyamide-imide, polystyrene, polycarbonate, poly-p-phenylene sulfide, polyether-ester, polyvinyl chloride, and poly(meth)acrylate.

The electroconductive layer of the invention may be conventional. The surface electric resistance thereof is preferably $10^4$ to $10^9$ Ω per area of 10 cm x 10 cm. The electroconductive layer may be (1) a layer comprising an electroconductive metal or metal oxide, (2) a layer comprising an ionconductive high polymeric electrolyte, or (3) a layer comprising an electroconductive powder, a high polymeric binder and a high polymeric electrolyte.

The high polymeric binder used for the insulating layer in the invention preferably has a volume specific resistance of $10^{12}$Ω·cm or more. The examples thereof include a vinyl acetate resin, an ethylene-vinyl acetate copolymer resin, a vinyl chloride resin, a vinyl chloride-vinyl acetate copolymer resin, a vinylidene chloride resin, a vinyl chloride-vinylidene chloride copolymer resin, an acrylate resin, a methacrylate resin, a butyral resin, a silicon resin, a polyester resin, a fluorinated vinylidene resin, nitrocellulose resin, a styrene resin, a styrene-acryl copolymer resin, a urethane resin, chlorinated polyethylene, rosin, a rosin derivative, and mixtures thereof.

The insulating spacer grains used in the invention may be conventional inorganic grains and/or organic polymer grains each having the volume specific resistance of $10^8\Omega\cdot cm$ or more, preferably $10^{10}\Omega\cdot cm$ or more. Examples of inorganic grains include metal oxide such as silicon oxide, titanium oxide, alumina, lead oxide and zirconium oxide, and salts such as calcium carbonate, barium titanate and barium sulfate. Examples of organic polymer grains include polyolefins such as polyethylene and polypropylene, starch, a styrene-divinylbenzene copolymer, a melamine resin, an epoxy resin, a phenol resin, and a fluorinated resin. These insulating spacer grains may be used singly or in combination of two or more kinds. Generally, the average grain size thereof is suitably selected from the range of 1 to 20 μm, preferably 3 to 15 μm, depending on the layer thickness of the insulating layer. In view of the protrusions which have to be formed on the insulating layer to ensure a discharge stability, the average grain size thereof is preferably selected in such a manner that the grain size is larger than the thickness of the layer. The weight ratio of the high polymeric binder to the insulating spacer grains is preferably 100/0.5 to 100/100, more preferably, 100/0.7 to 100/20. The ratio less than this limit deteriorates the discharge stability while the ratio exceeding the above limit lowers transparency.

Electroconductive materials employed in the hitherto conventional electrostatic recording film are various in grain sizes thereof and have possibility to disturb the appropriate discharge gap. Further, a too large grain size is liable to bring the electroconductive materials projecting from the surface of the insulating layer into contact with the recording electrode to damage the recording electrode, while a too small grain size has less effect on prevention of fog. For the above reasons, it is difficult to obtain always stably the sharp image using conventional electroconductive materials.

Further, because of larger specific gravities of the hitherto conventionally employed electroconductive materials which are merely added to a coating solution, they rapidly settle down in the coating solution, and therefore the dispersibility thereof is deteriorated. As the result, rapid coating and stability in continuous coating are deteriorated, which in turn results in the worse productivity. In order to solve these problems, it is necessary to make the grain sizes of the electroconductive materials uniform as much as possible and to make the specific gravities thereof smaller.

As the result of extensive investigations by the present inventors, it has been discovered that electroconductive grains comprising organic polymer grains with electroconductive materials coated thereon surprisingly overcome the above problems. That is, because it is easy to make the sizes of the above organic polymer grains uniform, the electroconductive grains comprising the organic polymer grains coated thereon with the electroconductive material can have completed grain size. For example, if the organic polymer grains having the same grain sizes as those of the insulating spacer grains contained in the insulating layer is employed, it is possible to make the sizes of the electroconductive grains almost same as those of the insulating spacer grains and therefore, a suitable discharge gap which is important in the electrostatic recording can be always maintained. Thus, it is possible to solve the above problem attributable to variation in the sizes of the electroconductive materials to obtain stably the sharp image. Further, the above electroconductive grains, which comprise the organic polymer grains, can have a smaller specific gravity than those of the electroconductive grains which consist only of the electroconductive materials. Therefore, settling of the grains during coating can be delayed and the dispersibility thereof can be improved as well.

In the present invention, coating organic polymer grains with electroconductive materials is done by plating, evaporation method, or a mechanochemical means, e.g. sticking fine grains on primary grains, but is not limited thereto.

The organic polymer grains used for the electroconductive grains of the invention are arbitrarily selected, for example, from polyolefins such as polyethylene and polypropylene, starch, a styrene-divinyl benzene copolymer, a melamine resin, an epoxy resin, a phenol resin, and a fluorinated resin. They may be used singly or in combination of two or more kinds. The average grain size of the above organic polymer grains is suitably selected from the range of 1 to 20 μm, preferably 3 to 15 μm.

The electroconductive materials coated on the above organic polymer grains preferably have a volume specific resistance of $10^{-6}$ to $10^4\Omega\cdot cm$, preferably $10^{-6}$ to $10^2\Omega\cdot cm$, and publicly known electroconductive materials may be used. Such electroconductive materials may be suitably selected from metals such as Al, Cr, Cd, Ti, Fe, Cu, In, Ni, Pd, Pt, Rh, Ag, Au, Ru, W, Sn, Zr, or In, alloys such as stainless steel, brass or Ni-Cr alloy, metal oxides such as indium oxide, tin oxide, zinc oxide, titanium oxide, vanadium oxide, ruthenium oxide or tantalum oxide, and metal compounds such as copper iodide, but are not limited thereto.

In the electroconductive grains of the present invention, the weight ratio of the organic polymer grains to the electroconductive materials coated on the organic polymer grains is preferably 10/1 to 10/50, more preferably 10/1 to 10/25. The electroconductive materials less than this limit increase the volume specific resistance to deteriorate the electric characteristics while the electroconductive materials exceeding this limit increase so excessively the specific gravity as to unfavorably accelerate the settling of the grains in the coating solution.

The weight ratio of the above electroconductive grains to the high polymeric binder is preferably 0.0002/100 to 0.02/100, more preferably 0.0004/100 to 0.01/100. The electroconductive grains less than this limit lowers the effect against prevention of fog while the electroconductive grains exceeding the above limit unfavorably cause a lot of pepper speck and scratchwise image dropout.

The thickness of the insulating layer is preferably 1 to 20 μm.

The insulating layer can be formed by:

(1) dissolving or dispersing the insulating high polymeric binder into a suitable solvent or water, (2) adding the insulating spacer grains and the electroconductive grains or a dispersion thereof to the above solution or dispersion, and dispersing them with a ball mill, etc. and (3) coating the dispersion in the above-mentioned layer thickness and then drying.

In the electrostatic recording film of the invention comprising the insulating film having provided thereon the electroconductive layer and the insulating layer in this sequence, the specific insulating layer, which provides an appropriate discharge gap obtained from the Paschen's curve between the recording electrode and the insulating layer, can be applied to obtain a sharp image with less fog, pepper speck and scratchwise image dropout. As described above, the electrostatic recording film of the invention has the excellent characteristics and therefore, it can be applied especially to an electrostatic printer-plotter or a printer for a facsimile as an electrostatic recording film for a hard copy.

The present invention is explained hereafter in more details with reference to the examples but is not limited thereto.

EXAMPLES 1 TO 5

An aqueous dispersion containing $SnO_2$ (Sb-doping) having an average grain size of 0.15 μm and gelatin in the weight ratio of 3/1 was coated on a 75 μm thick biaxially stretched polyethylene terephthalate film in a dry thickness of 0.2 μm to obtain an electroconductive film having a surface electric resistivity of $5\times10^6\Omega$ per area of 10 cm x 10 cm.

There was coated on this electroconductive film the coating solution prepared by adding a prescribed amount of Ni-coated bridged polystyrene beads (in the weight ratio of 1.5/10, average grain size of 8.0 μm) (Fine Pearl NI, manufactured by Sumitomo Chemical Co., Ltd.) as the electroconductive grains to the insulating layer-coating solution having the following composition in the dry weight of 4.4 $g/m^2$ to prepare the electrostatic recording film of the invention, the characteristics of which are summarized in Table 1.

An image is printed with a electrostatic plotter having a multi-pin electrode of 16 pins/mm (CE 3424, manufactured by Versatec Co.)

Fog was evaluated by measuring the difference in a reflection density between a blank film and the white portion of a recorded film with a Macbeth densitometers and the evaluation results were classified as x corresponding to the difference of 1.5 or more, Δ corresponding to 0.10 to 0.14, ○ corresponding to 0.05 to 0.09 and ⊚ corresponding to 0.04 or less.

Pepper speck was evaluated by printing one line in the same direction as that of a head and measuring the number of the portions per 100 mm, in which dots are broadened, and the evaluation results were classified to ⊚ corresponding to the number of 40 or less, ○ corresponding to 41 to 80, Δ corresponding to 81 to 160 and x corresponding to 161 or more.

Scratchwise image dropout was evaluated by printing a wholly black portion and measuring the number of dropouts in the area of 20 mm x 50 mm, and the evaluation results were classified to ⊚ corresponding to the number of 10 or less, ○ corresponding to 11 to 20, Δ corresponding to 21 to 30 and x corresponding to 31 or more.

In the above classifications, only the level of Δ or higher is deemed to have a practicability.

| Composition of the insulating layer-coating solution | |
|---|---|
| Toluene | 210 g |
| 2-Butanone(methylethylketone) | 42 g |
| Polymer binder | |
| Acrilic resin, Dianal BR-77 manufactured by Mitsubishi Rayon Co., Ltd. | 33 g |
| Rosin ester gum, AA-L manufactured by Arakawa Ind. Chemical Co., Ltd. | 2 g |
| Dispersion (20%) of polypropylene grains, insulating spacer grains, Unistall R100K (average grain size: 8.6 μm) manufactured by Mitsui Petrochemical Co., Ltd. | 13 g |

COMPARATIVE EXAMPLE 1

Example 1 was repeated to prepare the sample of Comparative Example 1, except that the electroconductive grain was removed from the insulating layer-coating solution.

COMPARATIVE EXAMPLES 2 AND 3

Comparative Example 1 was repeated to prepare the samples of Comparative Examples 2 and 3, except that electroconductive carbon black was added to the insulating layer coating-solution used in Comparative Example 1 as shown in Table 1.

COMPARATIVE EXAMPLE 4

Comparative Example 1 was repeated to prepare the sample for Comparative Example 4, except that the electrocondcutive $SnO_2$ grains (Sb-doped) having an average grain size of 0.2 μm were added to the insulating layer coating-solution used in Comparative Example 1 as shown in Table 1.

EXAMPLE 6

Comparative Example 1 was repeated to prepare the sample of Example 6, except that the electroconductive grains (an average grain size of 9.0 μm) prepared by mechanochemically coating polypropylene grains having an average grain size of 8.6 μm with the electroconductive $SnO_2$ grains (Sb-doped) having an average grain size of 0.2 μm, in the weight ratio of 1:1, were added to the insulating layer coating-solution used in Comparative Example 1 as shown in Table 1.

TABLE 1

| Example No. | Weight ratio of high polymeric binder to electroconductive grains in the insulating layer | Fog | Pepper speck | Scratchwise image dropout |
|---|---|---|---|---|
| Comp. Exam. 1 | 100/0 | x | ⊚ | ⊚ |
| Example 1 | 100/0.02 | ⊚ | ○ | ○ |
| Example 2 | 100/0.01 | ⊚ | ○ | ○ |
| Example 3 | 100/0.005 | ⊚ | ⊚ | ⊚ |
| Example 4 | 100/0.001 | ⊚ | ⊚ | ⊚ |
| Example 5 | 100/0.0002 | ○ | ⊚ | ⊚ |
| Comp. Exam. 2 | 100/0.005*1 | ○ | ○ | ○ |
| Comp. Exam. 3 | 100/0.0002 | Δ | ⊚ | ⊚ |
| Comp. Exam. 4 | 100/0.02*2 | x | ⊚ | ⊚ |
| Example 6 | 100/0.02*3 | ⊚ | ○ | ○ |

Note:
*1 High polymeric binder/carbon black
*2 High polymeric binder/electroconductive $SnO_2$ grains
*3 High polymeric binder/polypropylene grains coated with electrocondcutive $SnO_2$ grains

What is claimed is:

1. An electrostatic recording film comprising an insulating film having provided thereon an electroconductive layer and an insulating layer in this sequence, wherein the insulating layer comprises at least a polymeric binder, insulating spacer grains and electroconductive grains; said electroconductive grains being prepared by coating an electroconductive material on the surface of organic polymer grains.

2. The electrostatic recording film of claim 1, wherein the weight ratio of said organic polymer grains to said electroconductive material coated thereon is 10/1 to 10/50.

3. The electrostatic recording film of claim 1, wherein the weight ratio of said electroconductive grains to said polymeric binder is 0.0002/100 to 0.02/100.

4. The electrostatic recording film of claim 1, wherein the thickness of said insulating layer is from 1 to 20 μm.

5. The electrostatic recording film of claim 1, wherein particle size of said organic polymer grains is from 1 to 20 μm.

6. The electrostatic recording film of claim 1, wherein said polymeric binder is selected from the group consisting of a vinyl acetate resin, an ethylene-vinyl acetate copolymer resin, a vinyl chloride resin, a vinyl chloride-vinyl acetate copolymer resin, a vinylidene chloride resin, a vinyl chloride-vinylidene chloride copolymer resin, an acrylate resin, a methacrylate resin, a butyral resin, a silicon resin, a polyester resin, a fluorinated vinylidene resin, nitrocellulose resin, a styrene resin, a styrene-acryl copolymer resin, a urethane resin, a chlorinated polyethylene, a rosin, and a rosin derivative.

7. The electrostatic recording film of claim 1, wherein said insulating spacer grains are selected from the group consisting of silicon oxide, titanium oxide, alumina, lead oxide, zirconium oxide, calcium carbonate, barium titanate, barium sulfate, polyethylene, polypropylene, starch, a styrene-divinylbenzene copolymer, a melamine resin, an epoxy resin, a phenol resin, and a fluorinated resin.

8. The electrostatic recording film of claim 1, wherein said insulating spacer grains have an average grain size of from 1 to 20 μm.

9. The electrostatic recording film of claim 1, wherein the weight ratio of said polymeric binder to said insulating spacer grains is 100/0.5 to 100/100.

10. The electrostatic recording film of claim 1, wherein said organic polymer grains are selected from polyethylene, polypropylene, starch, a styrene-divinylbenzene copolymer, a melamine resin, an epoxy resin, a phenol resin, and a fluorinated resin.

11. The electrostatic recording film of claim 1, wherein said electroconductive material has a volume specific resistance of $10^{-6}$ to $10^{4}\Omega\cdot cm$.

12. The electrostatic recording film of claim 1, wherein said electroconductive material is selected from the group consisting of Al, Cr, Cd, Ti, Fe, Cu, In, Ni, Pd, Pt, Rh, Ag, Au, Ru, W, Sn, Zr, stainless steel, brass, Ni-Cr alloy, indium oxide, tin oxide, zinc oxide, titanium oxide, vanadium oxide, ruthenium oxide, tantalum oxide, and copper iodide.

* * * * *